(Model.)
E. F. FISHER.
NUT LOCK.
No. 283,092. Patented Aug. 14, 1883.
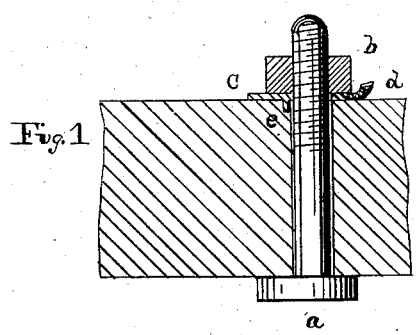
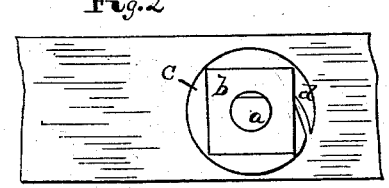
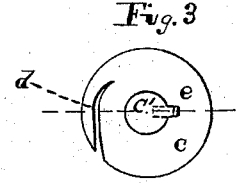
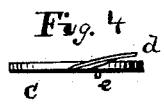
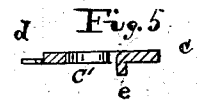
Witnesses:
Evelyn Emory.
Albert H. Adams.
Inventor,
Edward F. Fisher
by his atty
West & Bond

UNITED STATES PATENT OFFICE.

EDWARD F. FISHER, OF STRAWN, ASSIGNOR TO HIMSELF, AND JOSHUA E. DAVIS, OF BLOOMINGTON, ILLINOIS.

NUT-LOCK.

SPECIFICATION forming part of Letters Patent No. 283,092, dated August 14, 1883.

Application filed July 7, 1883. (Model.)

*To all whom it may concern:*

Be it known that I, EDWARD F. FISHER, residing at Strawn, in the county of Livingston and State of Illinois, and a citizen of the United States, have invented a new and useful Improvement in Nut-Locks, of which the following is a full description, reference being had to the accompanying drawings, in which—

Figure 1 is an elevation of a bolt, with the nut-washer and block in section; Fig. 2, an end view of the nut and bolt applied to a block; Fig. 3, a top or plan view of the washer; Fig. 4 an edge view, and Fig. 5 a cross-section, of the washer.

This invention relates to improvements in that class of nut-locks which are composed of a centrally-perforated disk slitted near its outer edge to form a marginal spring-tongue over which the nut can ride in screwing it on the bolt, but which tongue, by standing at an angle to the plane of the disk, prevents the nut from unscrewing. In such nut-locks, if the nut is to be removed for any purpose, it is necessary to press the spring-tongue down flush with the outer face of the disk, so as to allow the nut to pass over the tongue in unscrewing it from the bolt. As heretofore constructed, such spring-tongues have been made of the same thickness as the body of the disk, and in using them on harvesters and grain-binders which are painted and varnished after the completion of the structure, such paint or varnish, as well as dirt, collects beneath the spring-tongue, and therefore, if it is desired to detach the nut while the machine is in the field, it is difficult, if not impossible, to press the tongue down so as to bring it flush with the plane of the disk, owing to the collection of paint or dirt and the thickness of the tongue being the same as that of the disk, and consequently much time and labor are required to remove the nut, as it is necessary to thoroughly scrape off the paint and dirt under the tongue before the latter can be sufficiently depressed to remove the nut.

The object of my invention is to avoid the objections alluded to in this class of nut-locks; and to such end my invention consists in a centrally-perforated disk having its outer portion slitted to form a marginal spring-tongue, the thickness of such tongue being reduced to considerably less thickness than the body of the disk, the tongue being of such elastic nature that the nut can ride over it on being screwed upon the bolt, while the tongue can be conveniently depressed to bring it flush with the plane of the disk for unscrewing the nut, even though paint or dirt collect beneath the tongue, which result is effected by the reduced thickness of the tongue.

In the drawings, the letter C indicates a metal disk, having a central perforation, C', and preferably provided at the edge of the perforation with a laterally-projecting lip, e, which, after the disk has been placed on the bolt, can be forced into the wood-work through which the bolt passes, or be received in a recess formed in the wood-work or other part of the frame to be secured.

The metal disk is provided with a curved slit at its outer portion, to form a marginal curved spring-tongue, d, which is so shaped that its free end stands outward or laterally from the plane of the disk, and this tongue, in the process of manufacture, has its thickness reduced considerably less than that of the body of the disk, so that, if pressed down flush with the outer face of the disk, the under side of the tongue will be at a distance from the plane of the inner side of the disk, and a space consequently left between the tongue and the object secured by the bolt when the disk is in position to lock a nut.

In applying the device it is passed over the bolt until it rests against the wood-work or object to be secured, and the nut is then applied to the bolt, and in screwing the same in place it can freely depress the spring-tongue to ride over the latter, which tongue springs laterally outward whenever a corner of the nut passes it, whereby the nut is locked against reverse rotation and unscrewing action by reason of the tongue coming to a position of rest against one square side of the nut. The harvester or other structure to which the device has been thus applied can now be painted and varnished, and even if such paint or varnish, or even dirt, collect beneath the spring-tongue, the latter can be freely and conveniently depressed to bring it flush with the outer face of the disk when the nut is to be unscrewed from the bolt, which result is effected by reason of the thickness of the spring-tongue being reduced considerably less than the thickness of the body of the disk, which creates a space between the under side of the tongue and the wood-work or other part of the structure against which the disk rests, thereby providing means to permit the structure to be painted or varnished, and even the collection of dirt under the tongue, without preventing the latter from being conveniently and easily depressed to unscrew the nut when desired. By reducing the thickness of the tongue less than that of the body of the disk, the tongue is also rendered more elastic, and its lateral spring action is rendered more delicate than where the tongue is made of the same thickness as the body of the disk. Consequently the application of the nut is more easily effected and the tongue can be depressed with less power.

I do not wish to be understood as broadly claiming a nut-lock composed of a perforated disk slitted to form a marginal spring-tongue over which the nut can ride in screwing it in place; nor do I desire to claim a washer having flanges of reduced thickness, which are bent outward against the side of a nut after the latter has been screwed upon a bolt, or bent into the wood to prevent the washer from turning, and also bent outward against the side of the nut to lock it in place. My invention is confined particularly to the peculiar construction hereinbefore described to produce the results specified; and I therefore claim and desire to secure by Letters Patent—

As an improved article of manufacture, a nut-lock consisting of a metallic disk having at one edge a laterally-yielding spring-tongue formed of a thickness less than the thickness of the body of the disk, to create a space between the under side of the tongue and the wood-work or other object secured by the bolt when the tongue is depressed flush with the outer surface of the bolt, said tongue being of such elastic nature as to permit the nut to depress and ride over it in being screwed into place and spring outward to lock the nut, in the manner and for the purpose set forth.

EDWARD F. FISHER.

Witnesses:
ALBERT H. ADAMS,
O. W. BOND.